United States Patent
Konno

(10) Patent No.: US 6,333,787 B1
(45) Date of Patent: Dec. 25, 2001

(54) HYPERTEXT INFORMATION ACQUISITION SYSTEM AND COMPUTER-READABLE RECORDING MEDIUM STORING HYPERTEXT INFORMATION ACQUISITION PROGRAM

(75) Inventor: Hiromi Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,327

(22) Filed: Jan. 5, 1999

(30) Foreign Application Priority Data

Jul. 23, 1998 (JP) .................................................. 10-207364

(51) Int. Cl.[7] .............................. H04N 1/00; B41B 15/00
(52) U.S. Cl. ....................... 358/1.13; 358/400; 358/403; 707/501.1; 707/506
(58) Field of Search ................................... 358/400, 1.13, 358/403, 442; 379/100.07; 399/84; 707/501.1, 506, 513

(56) References Cited

U.S. PATENT DOCUMENTS 5,781,914 * 7/1998 Stork et al. .......................... 707/506

FOREIGN PATENT DOCUMENTS 9-321894 12/1997 (JP) .

* cited by examiner

*Primary Examiner*—Kimberly A. Williams
(74) *Attorney, Agent, or Firm*—Staas & Halsey LLP

(57) ABSTRACT

There is provided a hypertext information acquisition system which enables a user to follow hypertext links by designating a link to document contents by entering a numerical value indicative of a location of the link. User command analysis unit recognizes a coordinate value entered by the user from his telephone set and outputs the same to linked contents request unit. Linked contents request unit outputs to contents acquisition unit a request for acquisition of linked document contents associated with a location on an image generated from link-embedded document contents, the location being indicated by the link coordinate value. Image generation unit generates an image from document contents acquired by the contents acquisition unit, with the image matrix coordinate scales added thereto. The generated image is transmitted to a user's FAX machine by image transmission unit. Thus, the user can obtain the linked document contents via facsimile transmission simply by designating the coordinate value by using the telephone set.

6 Claims, 12 Drawing Sheets

| ADDRESSEE FAX NUMBER | LATEST ACCESS DATE | LATEST ACCESS TIME | SERVICE NUMBER | NUMBER OF TIMES OF ACCESS | STATUS FLAG |
|---|---|---|---|---|---|
| 0350003000 | 19980213 | 120030 | 0001 | 4 | 00 |
| 0432761000 | 19980213 | 130025 | 0002 | 2 | 00 |
| ⋮ | ⋮ | ⋮ | ⋮ | ⋮ | ⋮ |

| MENU NUMBER | URL ADDRESS | DESCRIPTION |
|---|---|---|
| 0000 | www.home.com.··· | TOP |
| 0001 | www.fujiyama.··· | MT. FUJI |
| ⋮ | ⋮ | ⋮ |

FIG. 6

HYPERTEXT INFORMATION ACQUISITION SYSTEM AND COMPUTER-READABLE RECORDING MEDIUM STORING HYPERTEXT INFORMATION ACQUISITION PROGRAM

BACKGROUND OF THE INVENTION

1. Field of the Invention

The present invention relates to a hypertext information acquisition system and a computer-readable recording medium storing a hypertext information acquisition program, and more particularly to a hypertext information acquisition system and a computer-readable recording medium storing a hypertext information acquisition program which is capable of acquiring desired document contents by following hypertext links.

2. Description of the Related Art

In the Internet, the WWW (world wide Web) is constructed based on hypertext, and many of the WWW pages (Web page contents) are written in a hypertext document format HTML (hypertext markup language). The HTML pages are linked by link information added to the pages. Link information is formatted by using a predetermined tag to define a link from one page to another. The user can select and designate a link information item in a displayed page to thereby access another page referenced by the link information item. Consequently, the user can access desired information easily by repeating this operation.

In general, a computer, such as a personal computer or a workstation, is used for access to information on the WWW. Hypertext information on the Internet can be accessed by connecting the computer to a network and activating a WWW browser. Recently, an apparatus designed for dedicated use for browsing the WWW, a television set having the capability of browsing the WWW, etc. have been developed and placed in commercial use. Further, even a portable intelligent terminal which is capable of browsing the WWW has been invented.

However, the problem is that since WWW browsing requires an apparatus having at least WWW browsing capability, such as the above-mentioned apparatuses, a person having no such apparatus at hand cannot access any WWW page. Moreover, if a personal user wants to have access to the Internet, it is required to make a contract with an internet service provider and posses a communication device such as a modem, which may be an excessive burden to a user who rarely utilizes the Internet.

A facsimile (hereinafter referred to as the "FAX") is a device for transmitting and receiving image information by using a telephone line. The FAX is widely used, so that it will be very convenient if the FAX can be used for receipt of WWW pages. However, since the WWW is constructed by the hypertext, it is required to provide some means for following links even when WWW pages are browsed by FAX. In conventional methods of accessing linked Web page contents, a pointing device or the like is used to designate a link (tagged link information) of contents linked to other Web page contents. However, to receive Web page contents by FAX, there has been no means for designating such a link to other Web page contents, which makes it impossible to acquire Web page contents referenced by a link within other Web page contents.

SUMMARY OF THE INVENTION

It is an object of the present invention to provide a hypertext information acquisition system which enables a user to designate a portion of document contents in a hypertext format linked to other document contents by entering numerical values indicative of the portion, to thereby access the linked document contents.

It is an another object of the invention to provide a computer-readable recording medium storing a hypertext information acquisition program for causing a computer to execute hypertext information acquisition processing which enables a user to designate a portion of a document contents linked to other document contents by entering numerical values indicative of the portion, to thereby follow hypertext links.

To attain the above objects, the present invention provides a hypertext information acquisition system for acquiring document contents in a hypertext form. This hypertext information acquisition system comprises contents acquisition means for acquiring document contents in response to a request, linked contents request means for outputting to the contents acquisition means a request for acquisition of linked document contents referenced by a link within link-embedded document contents, a location of the link being indicated by coordinates on an image generated from the link-embedded document contents, in response to inputting of a link coordinate value indicative of the coordinates, and image generation means for generating an image from document contents acquired by the contents acquisition means, the image having matrix coordinate scales added thereto.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram illustrating a user management table;

FIG. 6 is a diagram illustrating a service menu management table;

DESCRIPTION OF THE PREFERRED EMBODIMENTS

Preferred embodiments of the present invention will be described below with reference to the accompanying drawings.

Figure 1:
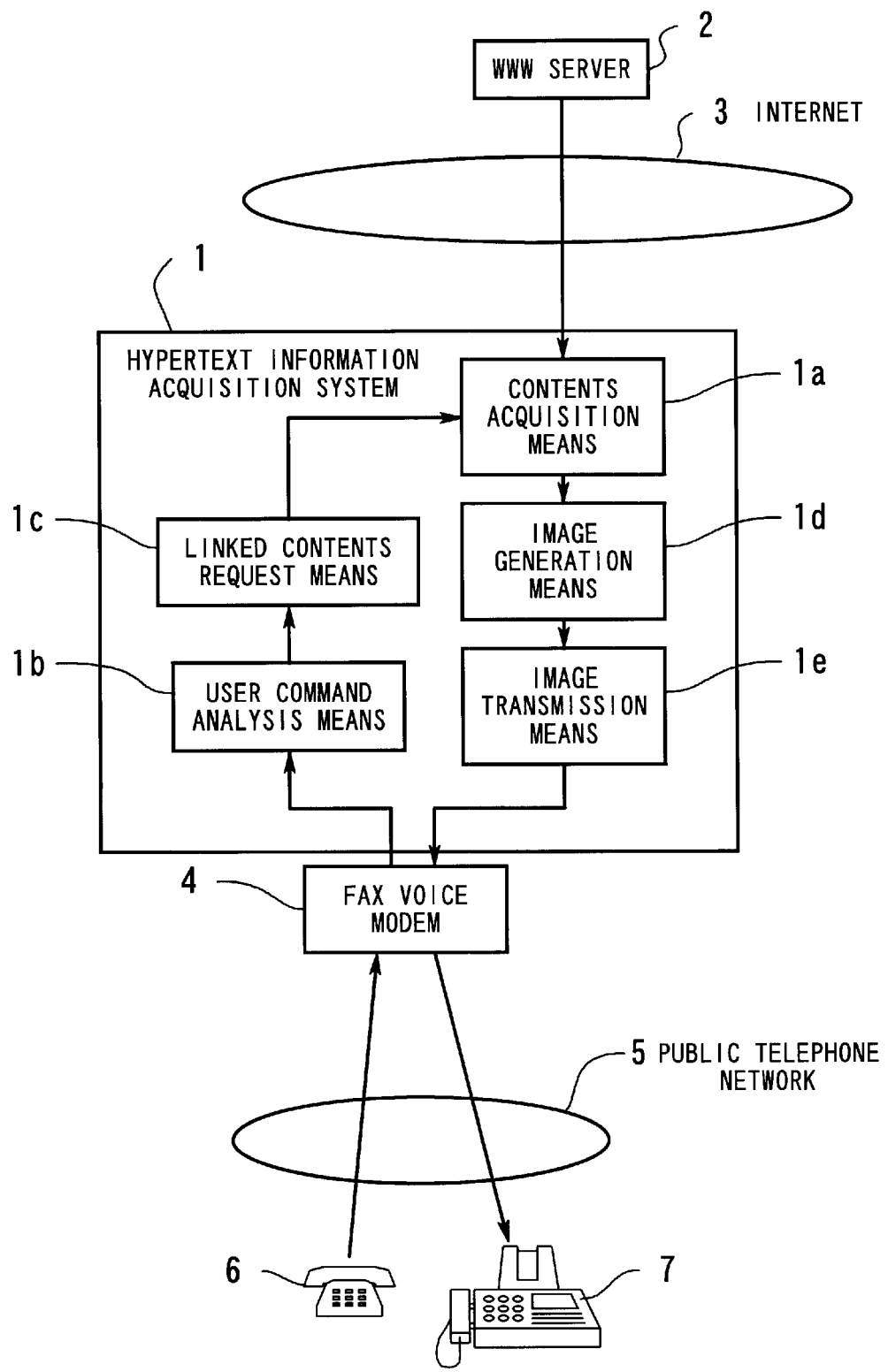
FIG. 1 is a conceptual representation showing principles of the present invention.

Referring first to FIG. 1, description is made of the principles of the present invention. A hypertext information acquisition system 1 of the invention is connected to a WWW server 2 via the Internet 3. Further, the hypertext information acquisition system 1 has a FAX voice modem 4 connected thereto for connection between the system 1 and a telephone set 6 and a FAX machine 7 via a public telephone network 5.

The hypertext information acquisition system 1 includes contents acquisition means 1a, user command analysis means 1b, linked contents request means 1c, image generation means 1d, and image transmission means 1e. These components have the following capabilities:

The contents acquisition means 1a downloads Web page contents from the WWW server 2 in response to a request by the user.

The user command analysis means 1b carries out interactive data communications with the user's telephone set 6 by using audio signals to thereby recognize a request from the user. When the user requests linked Web page contents referenced from link-embedded Web page contents, the user command analysis means 1b transfers a link coordinate value entered by the user by means of the telephone set 6 to the linked contents request means 1c.

The linked contents request means 1c delivers, to the contents acquisition means 1a, a request for acquiring the linked Web page contents associated with a location of a link referencing the linked Web page contents within an image generated from the link-embedded Web page contents, which location is designated by a link coordinate value indicative of coordinates thereof on the image. If the link-embedded Web page contents are on the WWW server 2, they are downloaded in advance via the contents acquisition means 1a.

The image generation means 1d generates the image of the Web page contents downloaded by the contents acquisition means 1a with scales of matrix coordinates added thereto.

The image transmission means 1e converts the image generated by the image generation means 1d to facsimile data and transmits the data to the FAX machine 7.

According to the hypertext information acquisition system 1 constructed as above, when a user designates coordinates of a location of a link within the link-embedded Web page contents by selectively pressing buttons of the telephone set 6, an audio signal representative of the coordinates is transmitted from the telephone set 6 to the hypertext information acquisition system 1 via the public telephone network 5. Then, the audio signal is analyzed by the user command analysis means 1b for identification of the buttons of the telephone set 6 pressed by the user. In other words, values of the coordinates designated by the user are recognized. The coordinate values are delivered to the linked contents request means 1c.

The linked contents request means 1c identifies the location within the image generated from the link-embedded Web page contents by using the coordinates designated by the user, and then outputs a request for acquiring other Web page contents referenced by the link at the location. The contents acquisition means 1a receives the request, and downloads the linked Web page contents according to the request. The downloaded Web page contents are sent to the image generation means 1d. The image generation means 1d generates an image having scales of matrix coordinates added thereto. The image generated by the image generation means 1d is sent by the image transmission means 1e to the user's FAX machine 7 as FAX data.

Thus, the user can access or obtain linked Web page contents by designating coordinates of a location of a link embedded in link-embedded Web page contents. Further, since the thus obtained Web page contents have matrix coordinate scales added thereto, it is possible to sequentially access other Web page contents. That is, the user can obtain desired Web page contents by using the FAX machine 7, by the same procedure as followed in acquiring Web page contents by using a normal WWW browser.

Next, embodiments of the present invention will be described in detail. It should be noted that in the embodiment described below, the hypertext information acquisition system is incorporated in a navigator server.

Figure 2:
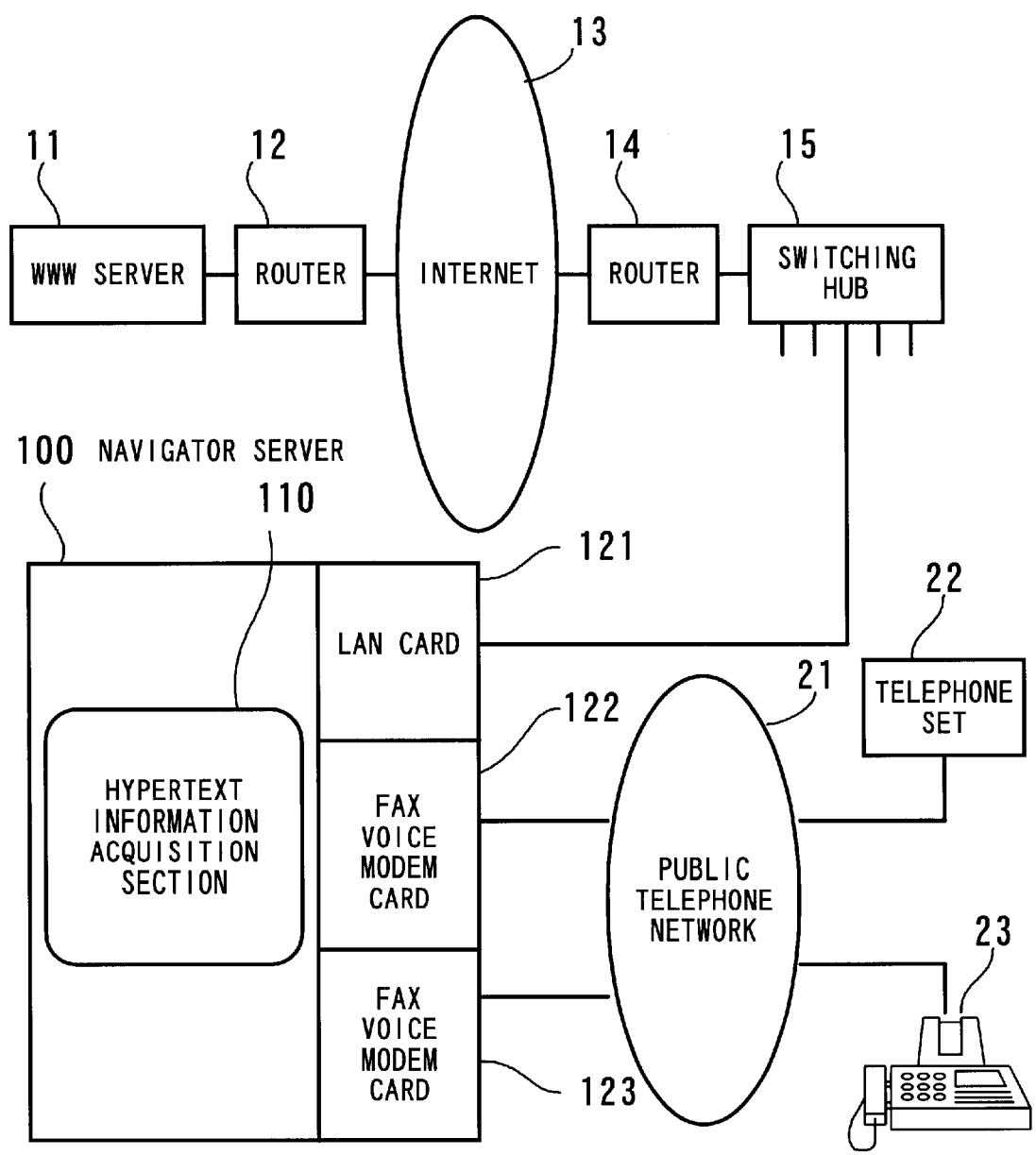
FIG. 2 is a block diagram showing a system configuration according to an embodiment of the present invention.

Referring first to FIG. 2, there is shown a system configuration of the hypertext information acquisition system according to the present embodiment. The navigator server 100 is connected to the Internet 13 via a switching hub 15 and a router 14. The navigator server 100 is connected to a public telephone network 21 as well.

A WWW server 11 is connected to the Internet 13 via a router 12. The WWW server 11 stores hypertext information expressed in the HTML (hypertext markup language) and provides the stored hypertext data to other systems in response to data acquisition requests based on HTTP (hypertext transfer protocol). Connected to the public telephone network 21 are a telephone set 22 and a FAX machine 23. The telephone set 22 is a so-called touch-tone telephone (which generates two simultaneous tones having different frequencies in response to each depression of a button or key on the telephone's key pad to thereby transmit a telephone number).

The navigator server 100 includes a hypertext information acquisition section 110 for controlling user guidance and acquisition of hypertext contents. Further, the navigator server 100 has an Ethernet LAN card 121 for connecting the server 100 to the switching hub 15 and a plurality of FAX voice modem cards 122, 123 for connecting the server 100 to the public telephone network 21. The FAX voice modem cards 122, 123 enable data communication as well as voice communication. The FAX voice modem cards 122, 123 also have the capabilities of transmitting and receiving facsimile data.

Figure 3:
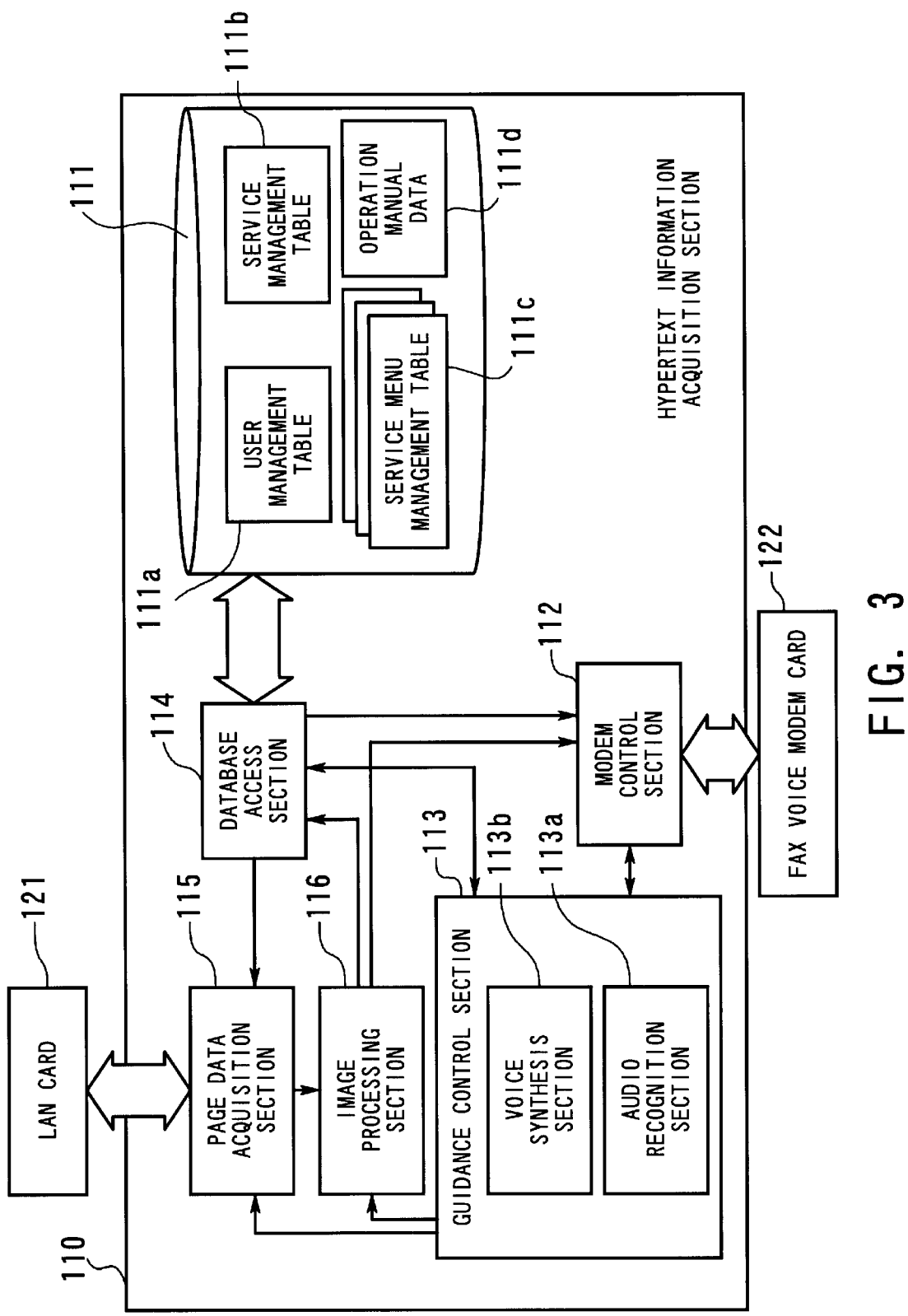
FIG. 3 is a block diagram showing an internal construction of a hypertext information acquisition section.

FIG. 3 shows the internal construction of the hypertext information acquisition section 110. The section 110 is comprised of components described below. Capabilities of the components are realized by a CPU of the navigator server 100 which executes a program describing details of processing by loading the program from a computer-readable recording medium storing the same.

The database 111 stores various kinds of tables required for providing services for users, including a user management table 111a, a service management table 111b, and service menu management tables 111c. The user management table 111a manages information of each user, such as a FAX number, while the service management table 111b stores details of service provided for each user for control of the service. The service menu management tables 111c are provided on a user-by-user basis, and each of the tables 111c stores browsing history information of Web pages accessed by the user for whom the table is provided. These tables 111a, 111b, 111c will be described in further detail hereinafter. The database 111 further stores operation manual data 111d for new users of this system.

A modem control section 112 controls the FAX voice modem card 122. More specifically, the modem control section 112 transfers audio information from the FAX voice modem card 122 to a guidance control section 113, and vice versa. Further, when image information to be provided for the user is sent from an image processing section 116, the modem control section 112 converts the image information to facsimile data and transmits the same to the FAX voice modem card 122.

The guidance control section 113 performs functions such as outputting a voice message to the user, recognizing contents of input from the user, and so forth. When it is required to output a voice massage to the user, the section 113 outputs appropriate words for explaining operation to be carried out next, in response to an input from the user. Further, when a request for page data is received from the user, the section 113 sends identification information (service number or matrix coordinates) for identifying the data to a database access section 114 and the image processing section 116. The guidance control section 113 includes an audio recognition section 113a and a voice synthesis section 113b.

When audio information is received from the modem control section 112, the audio recognition section 113a analyzes tones of the audio information to thereby determine which button of the user's telephone set was pressed. The voice synthesis section 113b generates audio information for instructing the user of operation to be carried out next and delivers the same to the modem control section 112.

The database access section 114 accesses the database 111 in response to a request sent from the guidance control section 113, etc., and extracts necessary information from the tables within the database 111. In some cases, the database access section 114 returns a response to the request either to the guidance control section 113 and in other cases to a page data acquisition section 115. When it is required to verify the user's FAX number, a response is returned to the guidance control section 113, while when it is required to download page data, information indicative of a location of the page data (e.g. the URL (Uniform Resource Locator) of the page data) is delivered to the page data acquisition section 115.

The page data acquisition section 115 manages data input/output between the LAN card 121 and the hypertext information acquisition section 110. When the URL of specific page data is received from the database access section 114, etc., the page data acquisition section 115 downloads the page data from the Internet. Further, if an HTML file is specified, the section 115 downloads not only the specified HTML file but also image data instructed to be displayed in the file as an inline graphic image. The downloaded page data is sent to the image processing section 116.

The image processing section 116 generates an image to be faxed, based on the received page data. The generated image information is identical to an image displayed on a typical WWW browser. In doing this, if the page data contains information of a link (which is indicated by an anchor tag in the HTML) to other data, a portion of the image where the link is embedded is boxed by bold lines. Further, scales of matrix coordinates are added to the image information generated from the page data. The image information having the scales added thereto is sent to the modem control section 112. If a matrix coordinate value entered by the user to designate a link to Web page contents is received from the guidance control section 113 after Web page data containing the link has been input, the link corresponding to the matrix coordinates is retrieved and the URL of the link is sent to the page data acquisition section 115.

Now, the correspondence between the component elements of the hypertext information acquisition system 1 shown in FIG. 1 and those of the hypertext information acquisition section 110 shown in FIG. 3 is explained. The contents acquisition means 1a corresponds to the page data acquisition section 115. The user command analysis means 1b corresponds to the guidance control section 113. The linked contents request means 1c and the image generation means 1d correspond to the image processing section 116, and the image transmission means 1e to the modem control section 112.

FIG. 4 illustrates a user management table. The user management table 111a includes columns of "addressee's FAX number", "date of latest access", "time of latest access", "service number","number of times of access" and "status flag", in each of which a corresponding information item of each user is entered. Registered in the column of "addressee's FAX number" is a FAX number used for faxing information to each user. The "date of latest access" stores a date of the latest access made by each user. The date is represented by eight digits, in which the first four digits represent a year, the second two a month, and the last two a day. The "time of latest access" stores a time of day at which the latest access was made by each user. The time of day is represented by six digits, in which the first two digits represents an hour, the second two a minute, and the last two a second. In the "service number", identification numbers assigned to respective users for identification are registered. The "number of times of access" stores the number of times each of the users utilized the present system. The "status flag" indicates a status of service provided for each user. If the "status flag" assumes a value of "00",it indicates that the service is normal, whereas if the same assumes a value of "01", it indicates that the service is abnormal (i.e. that some trouble has occurred). Further, a value of "02" indicates that the system is in a wait state waiting for a response, a value of "03" that the system being carrying out processing, and a value of "04" that the system is not yet utilized.

Figure 5:
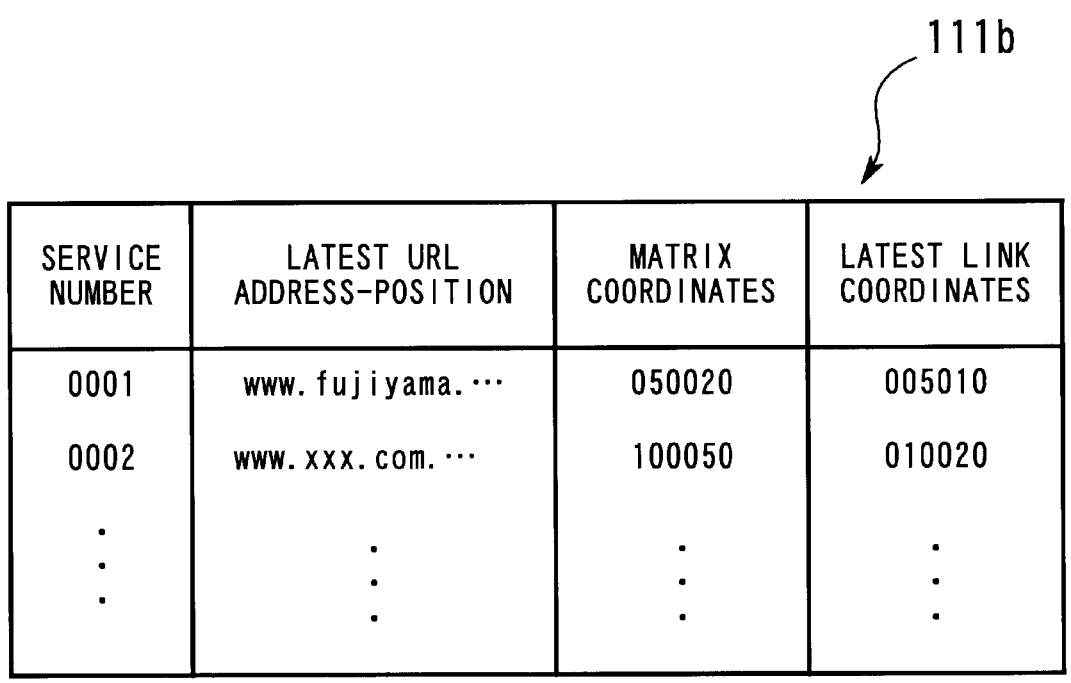
FIG. 5 is a diagram illustrating a service management table.

FIG. 5 illustrates the service management table 111b. The service management table 111b includes columns of "service number", "latest URL address-position", "matrix coordinates" and "latest link coordinates", and details of service associated with each service number are stored in the respective fields. Registered in the column of "service number" are service numbers of users. The column of the "latest URL address-position" stores the URL of page data provided most recently for each user having the corresponding service number. The column of the "matrix coordinates" stores a maximum matrix coordinate value used during each FAX transmission. Each matrix coordinate value is represented by six digits, in which the first three digits represent an X coordinate, and the second three a Y coordinate. In this embodiment, the X axis extends vertically, while the Y axis extends horizontally. The column of the "latest link coordinates" stores response coordinate values each indicative of a designated location of a link within a faxed information item (i.e. a coordinate value designated by a user for acquisition of linked Web page contents). Each value of the latest link coordinates is represented by six digits, in which the first three digits indicate an X coordinate, and the second three a Y coordinate.

FIG. 6 illustrates the service menu management table 111c. The service menu management table 111c includes columns of "menu number", "URL address" and "description", whereby information items concerning each page to be provided for users are entered in the respective columns. The column of "menu number" stores menu numbers for use in managing URL addresses. The column of "URL address" stores the URL addresses of page data to be provided for the users. The "description" stores a description of each of the URL addresses.

Next, description will be made of a procedure of page data-acquiring processing carried out by the system constructed as above when the user obtains page data by FAX.

Figure 7:
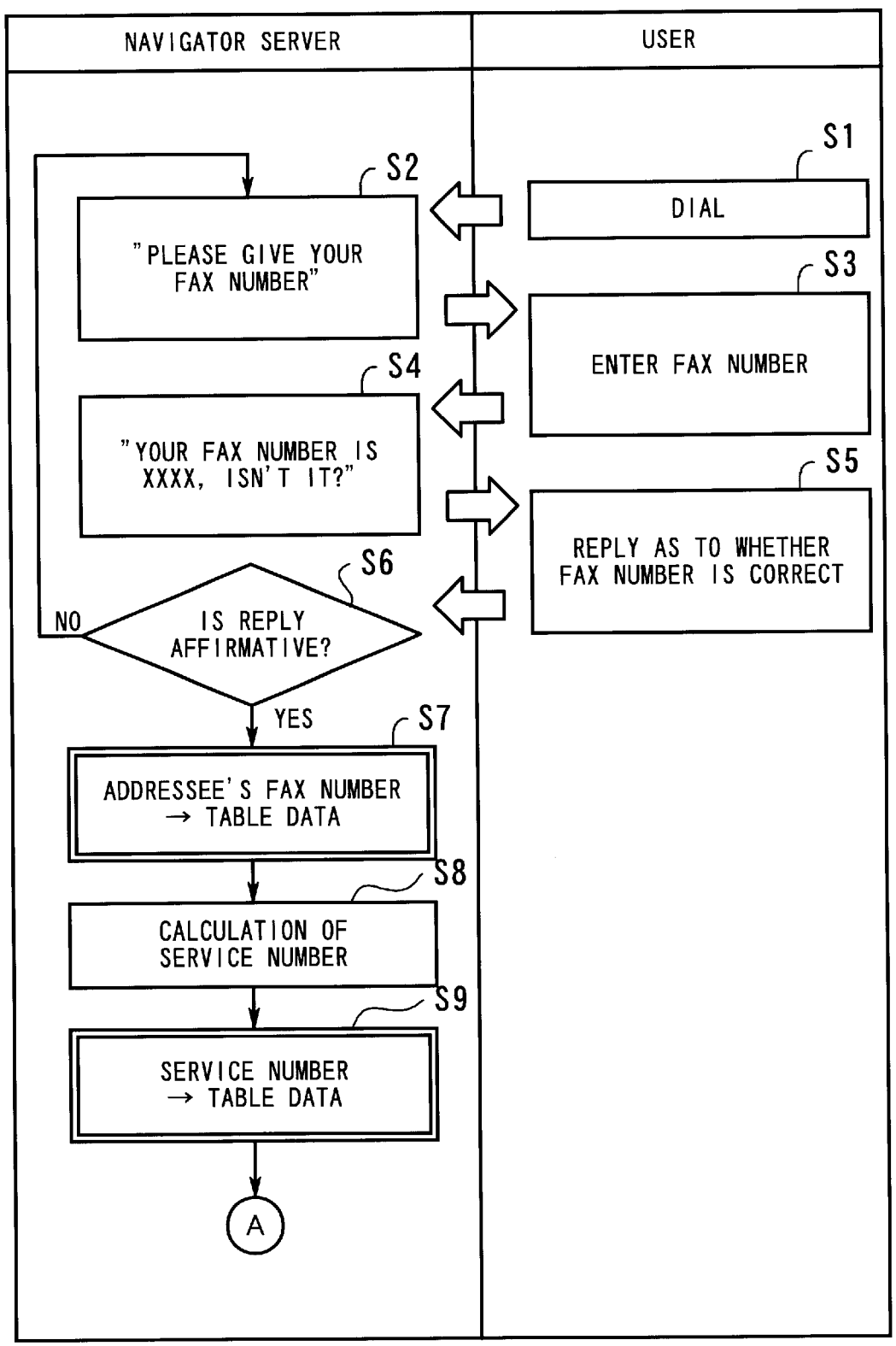
FIG. 7 is a first part of a flowchart showing a preparatory stage of a procedure of page data-acquiring processing.

FIG. 7 shows the first part of a preparatory stage of the procedure of the page data-acquiring processing. At the preparatory stage, a service number is given to a new user, and then processing for providing the new user with a manual, a service menu list, etc. is executed.

[S1] The user makes a call to the navigator server 100 by using the telephone set 22 via a telephone line connected to the navigator server 100.

[S2] The FAX voice modem card 122 of the navigator server 100 receives the call from the user, and delivers information of the call receipt to the guidance control section 113 via the modem control section 112 of the hypertext information acquisition section 110. The guidance control section 113 causes the voice synthesis section 113b to synthesize a voice message saying "Please give us your FAX number." and sends the voice message to the modem control section 112. The modem control section 112 transfers the voice from the guidance control section 113 to the user's telephone set 22 via the FAX voice modem card 122.

[S3] When receiving the voice message from the navigator 100, the user enters his/her own FAX number by pressing specific buttons of the telephone set 22. When each button is pressed, an audio signal consisting of two tones having respective different frequencies indicative of a digit assigned to the button is sent to the navigator server 100.

[S4] In the navigator server 100, the number of each digit of the user's FAX number is sent to the guidance control section 113. Then, the audio recognition section 113a of the guidance control section 113 analyzes the two-tone audio signal to determine which button of the telephone set 22 was pressed. When the FAX number from the user is completely inputted, the guidance control section 113 puts in order the numbers of digits corresponding respectively to the buttons recognized by the audio recognition section 113a, to thereby identify the user's FAX number. When the FAX number is identified, the guidance control section 113 causes the voice synthesis section 113b to synthesize a voice message saying "Your FAX number is 'XXXX', isn't it? If it is correct, please press the button '0'. If not, please press the button '1'", and sends the same to the user's telephone set 22.

[S5] When receiving the message from the navigator server 100, the user replies to the query by pressing the button '0' if the FAX number is correct or by pressing the button '1' if the FAX number is incorrect.

[S6] The reply from the user is sent to the guidance control section 113 and interpreted by the audio recognition section 113a. The guidance control section 113 determines whether the reply is affirmative or negative. If the reply is affirmative (i.e. if the button '0' was pressed), the program proceeds to a step S7, whereas if the reply is negative (i.e. if the button '1' was pressed), the program returns to the step S2, wherein input of the FAX number is received again.

[S7] The guidance control section 113 sends the addressee's FAX number to the database access section 114. The database access section 114 registers the addressee's FAX number in the user management table 111a as a new record.

[S8] The database access section 114 calculates a service number associated with the registered record.

[S9] The database access section 114 registers the service number calculated at the step S8 in the column of "service number" of the user management table 111a, and then sends the registered service number to the guidance control section 113.

Figure 8:
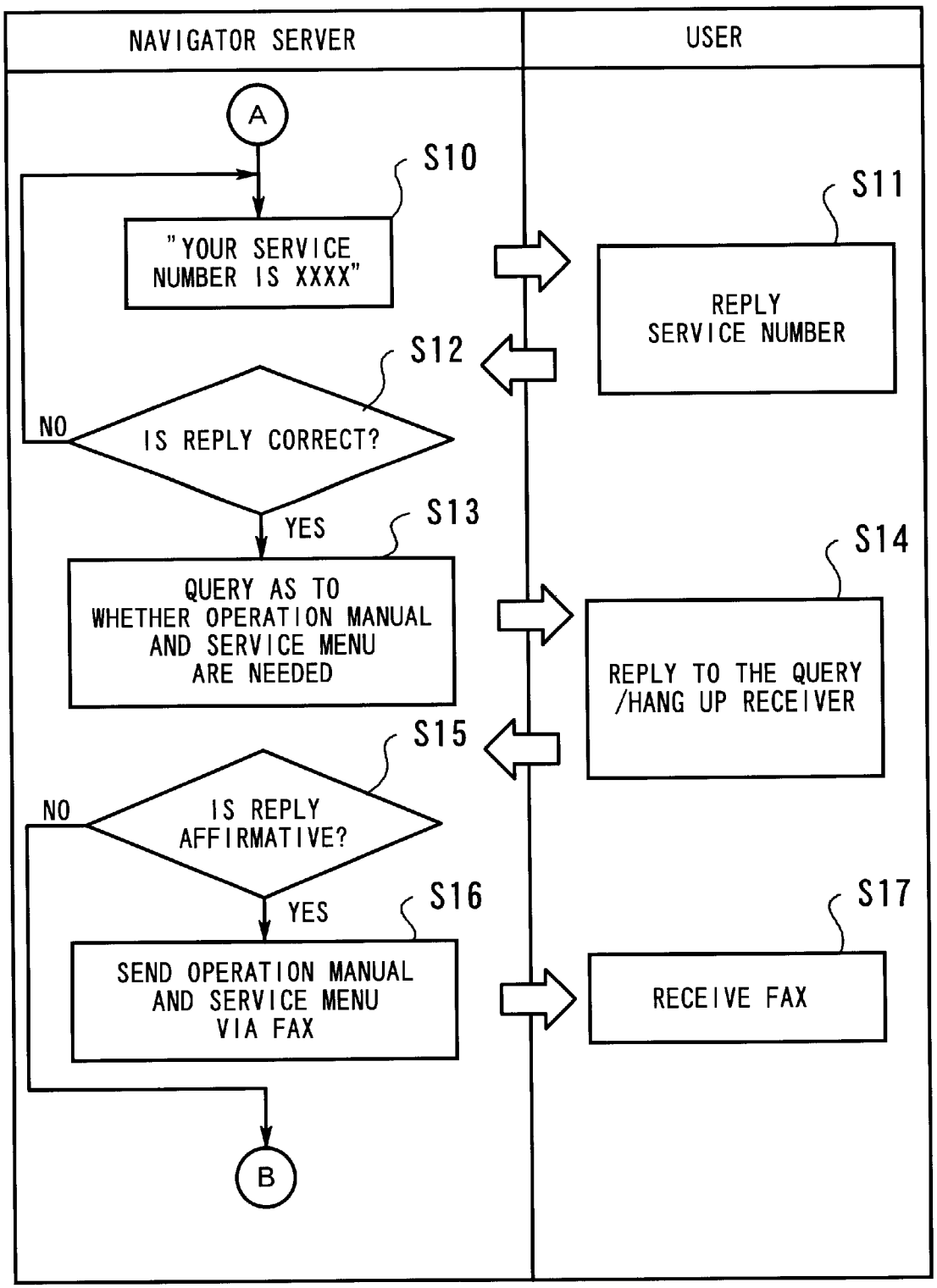
FIG. 8 is a second part of the flowchart showing the preparatory stage.

FIG. 8 shows the second part of the preparatory stage of the procedure of the page data-acquiring processing.

[S10] The guidance control section 113 notifies the user of the service number received from the database access section 114. More specifically, the guidance control section 113 causes the voice synthesis section 113b to synthesize a voice message saying "Your service number is 'XXXX'. Please enter the service number", and sends the generated voice message to the user's telephone set 22.

[S11] The user listens to the voice message from the navigator server 100 and catches the service number. Thereafter, when the user presses buttons according to the service number, audio signals generated by pressing the buttons are sent to the navigator server 100.

[S12] The guidance control section 113 of the hypertext information acquisition section 110 receives the audio signals from the user's telephone set 22, and the audio recognition section 113a analyzes each signal to identify the number indicated by the signals. The guidance control section 113 determines whether or not the number identified by the audio recognition section 113a is identical with the service number received from the database access section 114. If the two numbers are identical with each other, the program proceeds to a step S13, whereas if not, the program returns to the step S10, wherein notification of the service number is performed again.

[S13] The hypertext information acquisition section 110 inquires of the user as to whether the manual and service menu are needed. More specifically, a message saying "If you need an operation manual and a service menu, please press the button '0'. If not, please press the button '1'" is sent to the user.

[S14] If the operation manual and service menu are needed, the user replies to the query by pressing the button '0', and hang up the telephone receiver. On the other hand, if the operation manual and service menu are already provided, and hence they are not needed, the user presses the button '1' and waits for another message without hanging up the receiver.

[S15] The guidance control section 113 of the hypertext information acquisition section 110 determines whether the reply is affirmative or negative. If the reply is affirmative, the program proceeds to a step S16, whereas if the reply is negative, the program proceeds to a step S27 (see FIG. 9).

[S16] The guidance control section 113 transfers the request for transmission of the operation manual and service menu to the database access section 114. The database access section 114 fetches operation manual data 111d from the database 111. At the same time, the database access section 114 prepares the service menu based on the contents of the service menu management table 111c and sends the same to the modem control section 112 together with the operation manual data 111d. Thus, the operation manual and service menu are transmitted to the user's FAX machine 23.

[S17] The operation manual and service menu are received by the user's FAX machine 23 and printed out.

Next, description will be made of an acquiring stage of the procedure of the page data-acquiring processing, which is executed according to the service menu.

Figure 9:
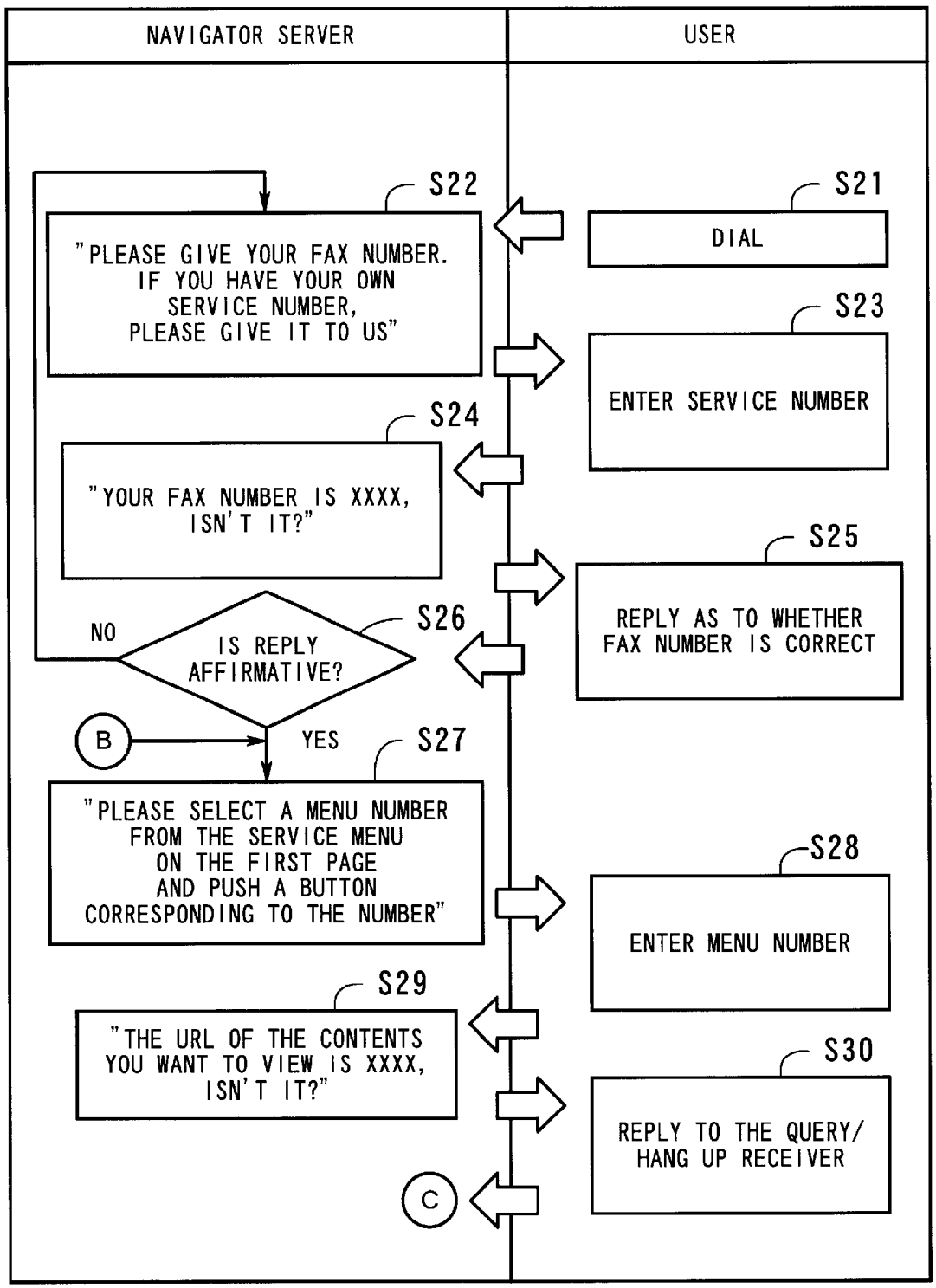
FIG. 9 is a first part of a flowchart showing a procedure for acquiring Web page contents selected from a service menu.

FIG. 9 shows the first part of the acquiring stage. A sequence of operations from steps S21 to S26 are carried out only when the user hangs up the receiver at the step S14 in FIG. 8.

[S21] The user makes a call to the navigator server 100 by using the telephone set 22 via a telephone line connected to the navigator server 100.

[S22] The FAX voice modem card 122 of the navigator server 100 receives the call from the user, and delivers information of the call receipt to the guidance control section 113 via the modem control section 112 of the hypertext information acquisition section 110. The guidance control section 113 causes the voice synthesis section 113b to synthesize a voice message saying "Please give us your FAX number. If you have your own service number, please give it to us", and sends the voice message to the modem control section 112. The modem control section 112 transfers the voice message from the guidance control section 113 to the user's telephone set 22 via the FAX voice modem card 122.

[S23] When receiving the voice message from the navigator 100, the user enters his/her own service number. The entered service number is sent to the navigator server 100 as audio signals.

[S24] The guidance control section 113 of the navigator server 100 causes the audio recognition section 113a to identify the service number sent from the user's telephone set 22, and sends a request to the database access section 114 for retrieval of a FAX number corresponding to the service number. The database access section 114 searches the user management table 111a in the database 111 in response to the request from the guidance control section 113 to extract an addressee's FAX number from a record in which the entered service number is registered. The extracted FAX number is sent to the guidance control section 113. When receiving the addressee's FAX number, the guidance control section 113 inquires of the user as to whether the FAX number is correct. More specifically, the guidance control section 113 causes the voice synthesis section 113b to synthesize a voice message saying "Your FAX number is 'XXXX', isn't it? If it is correct, please press the button '0'. If not, please press the button '1'", and sends the same to the user's telephone set 22.

[S25] When receiving the voice message from the navigator server 100, the user presses the button '0' if the FAX number is correct, or presses the button '1' if the FAX number is incorrect.

[S26] The guidance control section 113 of the navigator server 100 causes the audio recognition section 113a to identify the button pressed by the user. If the button '0' was pressed, the program proceeds to a step S27, whereas if the button '1' was pressed, the program returns to the step S22.

[S27] The guidance control section 113 prompts the user to select a menu number from the service menu and enter the same. More specifically, the guidance control section 113 causes the voice synthesis section 113b to synthesize a voice message saying "Please select a menu number from the service menu on the first page and push a button corresponding to the number", and sends the same to the user's telephone set 22.

[S28] When receiving the voice message from the navigator server 100, the user selects Web page contents which he/she wants to view from the service menu acquired in advance, and enters a menu number corresponding to the contents.

[S29] The guidance control section 113 of the navigator server 100 recognizes the menu number entered by the user, and delivers the same to the database access section 114. The database access section 114 searches the service menu management table 111c to extract a URL address associated with the menu number received from the guidance control section 113, and sends the same to the guidance control section 113.

The guidance control section 113 inquires of the user as to whether the Web page contents having the URL address received from the database access section 114 should be faxed. More specifically, a message saying "The URL of the contents you want to view is "XXXX", isn't it? If it is correct, please press the button '0'. If not, please press the button '1'" is transmitted to the user's telephone set 22.

[S30] The user replies to the query from the navigator server 100, and then hangs up the receiver.

Figure 10:
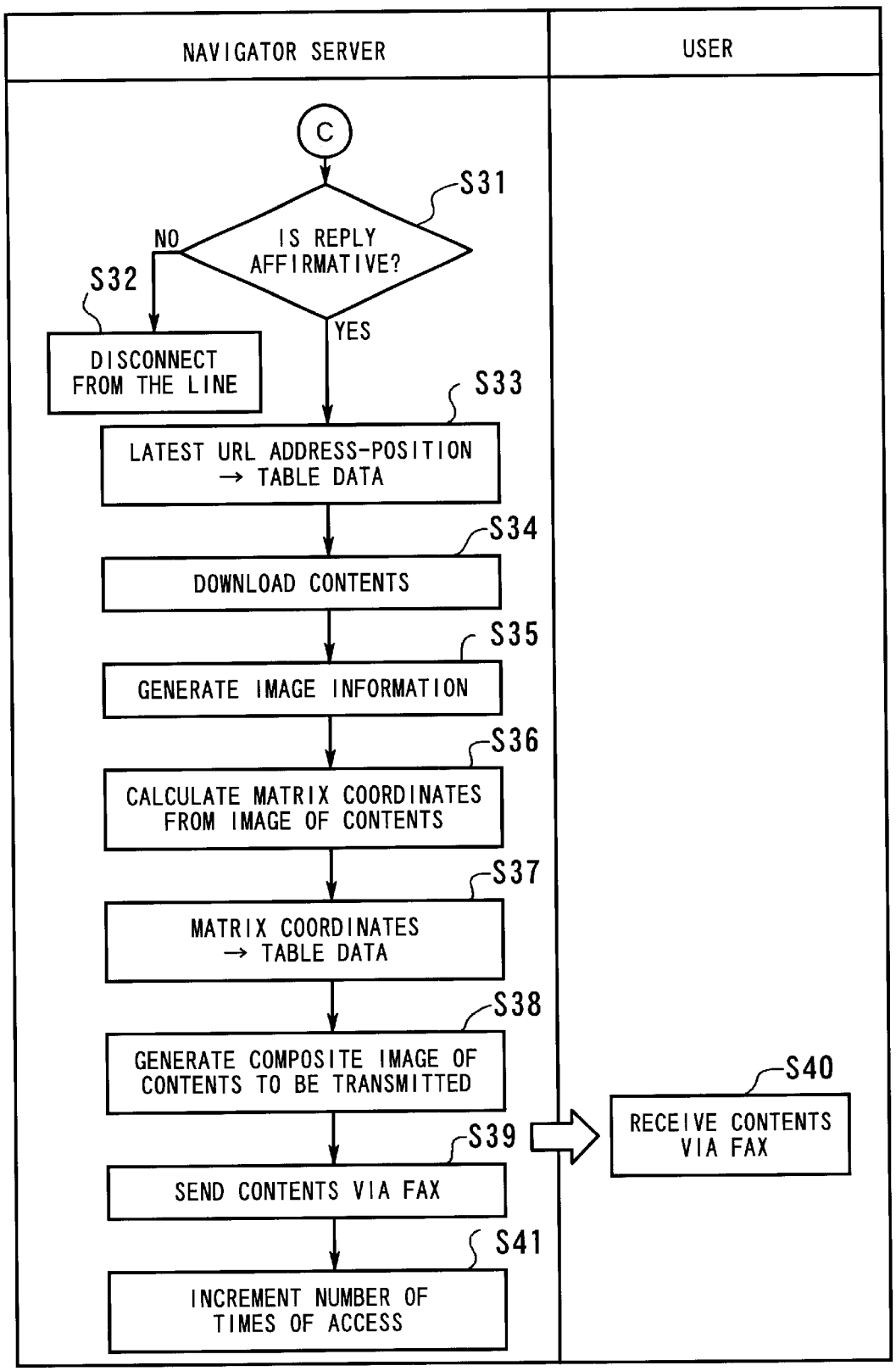
FIG. 10 is a second part of the flowchart showing the procedure for acquiring the Web page contents selected from the service menu.

FIG. 10 shows the second part of the acquiring stage of the procedure of the page data-acquiring processing.

[S31] The guidance control section 113 of the navigator server 100 analyzes the user's reply to determine whether or not the URL is correct. If the URL is correct, the program proceeds to a step S33, whereas if the URL is incorrect, the program proceeds to a step S32.

[S32] The guidance control section 113 instructs the modem control section 112 to disconnect the navigator server 100 from a line connecting between the user's FAX and the navigator server 100. The modem control section 112 controls the FAX voice modem to disconnect the navigator server 100 from the line.

[S33] The database access section 114 registers the URL extracted at the step S29 in the service management table 111b as a latest URL address correlated to the service number identified at the step S24.

[S34] The page data acquisition section 115 receives from the guidance control section 113 the URL of the Web page contents to be downloaded, and then downloads the Web page contents from the WWW server connected to the navigator server 100 via the Internet. The downloaded Web page contents are delivered to the image processing section 116.

[S35] The image processing section 116 analyzes the Web page contents received from the page data acquisition section 115 and then generated image information. In doing this, links to other Web page contents are each boxed by bold lines for emphasizing purposes.

[S36] The image processing section 116 calculates matrix coordinates from the image of the contents and sends the maximum values of the matrix coordinates to the database access section 114.

[S37] The database access section 114 registers the received matrix coordinates in the service management table 111b.

[S38] The image processing section 116 adds scales of matrix coordinates to the image generated from the contents. The resulting composite image is sent to the modem control section 112.

[S39] The modem control section 112 transmits the image to the user's FAX machine 23 via the FAX voice modem card 122.

[S40] The user's FAX machine 23 receives the Web page contents from the navigator server 100 and prints out the image of the contents.

[S41] When the modem control section 112 completes the FAX transmission, information of the completion of the transmission is sent to the database access section 114. The database access section 114 increments the number of times of access stored in the user management table 111a in the database 111.

Thus, the user can obtain the desired contents selected from the service menu.

Figure 11:
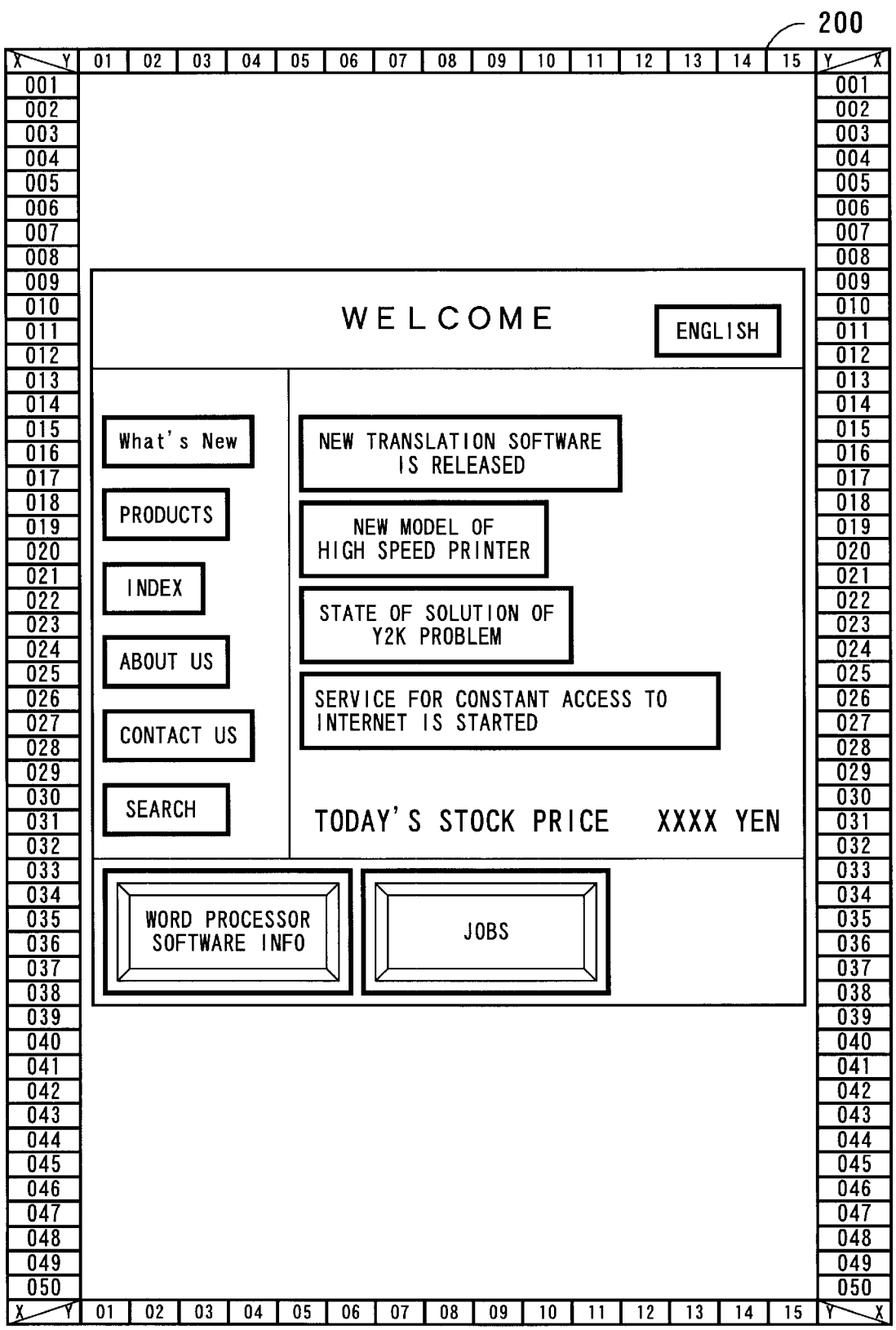
FIG. 11 shows an example of Web page contents outputted from a user's FAX machine.

FIG. 11 illustrates Web page contents outputted from the user's FAX machine. As shown in the figure, a sheet 200 outputted from the FAX machine 23 has edges thereof printed with coordinate scales. An image of contents is printed in a central portion of the sheet 200. Links to other Web page contents within the present Web page contents are each boxed by bold solid lines.

By designating matrix coordinates of such a boxed portion indicative of a link to Web page contents other than the current Web page contents, the linked Web page contents can be obtained.

Figure 12:
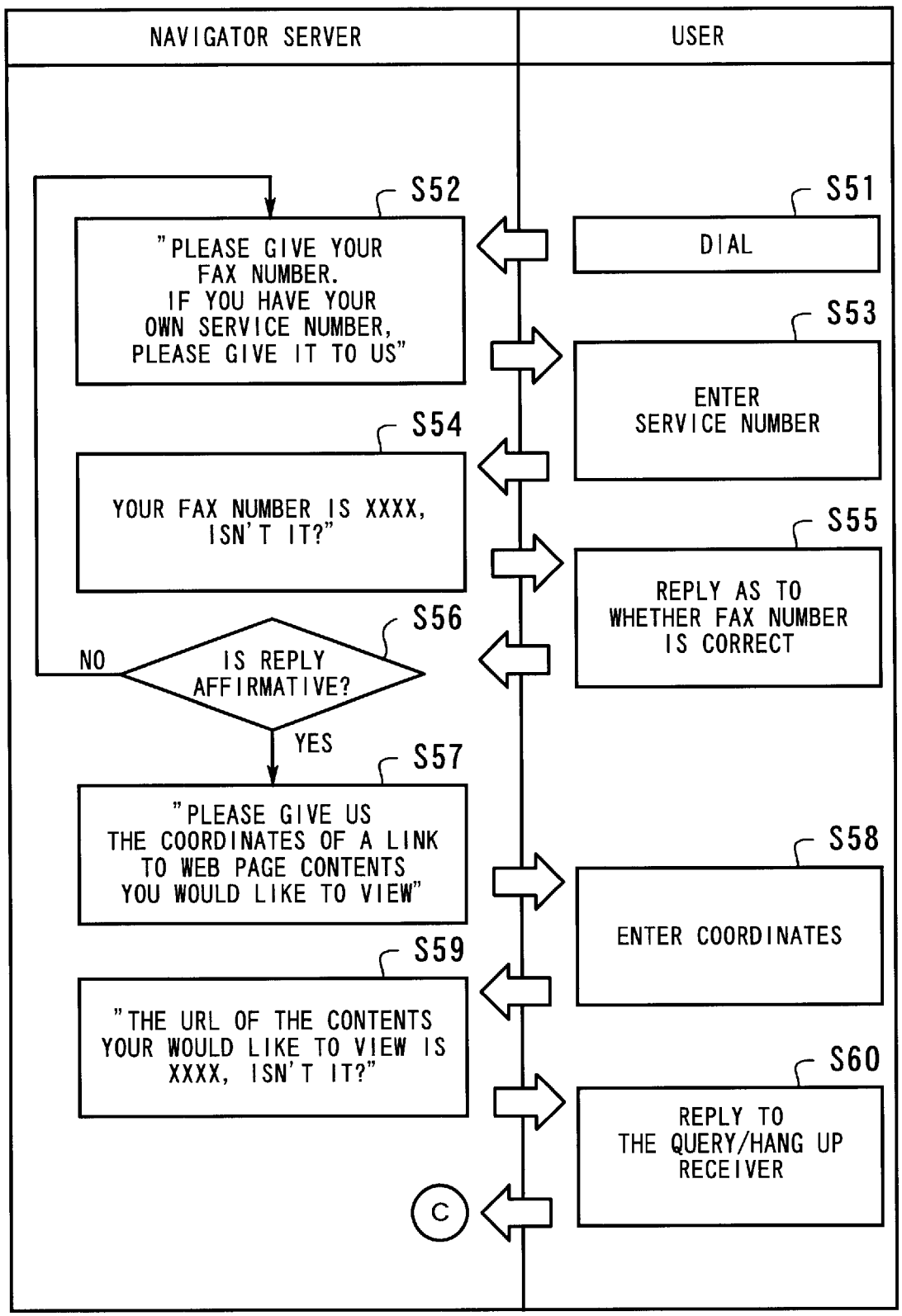
FIG. 12 is a flowchart showing a procedure for acquiring Web page contents by designating coordinates indicative of a location within the contents.

FIG. 12 shows a procedure for acquiring Web page contents by designating matrix coordinates of a link within the current Web page contents.

[S51] A user makes a call to the navigator server 100 by using telephone communication facility of the FAX machine via a telephone line connected to the navigator server 100.

[S52] The FAX voice modem card 122 of the navigator server 100 receives the call from the user, and delivers information of the call receipt to the guidance control section 113 via the modem control section 112 of the hypertext information acquisition section 110. The guidance control section 113 causes the voice synthesis section 113b to synthesize a voice message saying "Please give us your FAX number. If you have your own service number, please give it to us" and sends the voice message to the modem control section 112. The modem control section 112 transfers the voice message from the guidance control section 113 to the user's FAX machine 23 via the FAX voice modem card 122.

[S53] When receiving the voice message from the navigator 100, the user enters his/her own service number. The entered service number is sent to the navigator server 100 as audio signals.

[S54] The guidance control section 113 of the navigator server 100 causes the audio recognition section 113a to identify the service number sent from the user's FAX machine 23, and sends a request to the database access section 114 for retrieval of a FAX number associated with the service number. The database access section 114 searches the user management table 111a in the database 111 in response to the request from the guidance control section 113 to extract an addressee's FAX number from a record in which the entered service number is registered. The extracted FAX number is sent to the guidance control section 113.

When receiving the addressee's FAX number, the guidance control section 113 inquires of the user as to whether the FAX number is correct. More specifically, the guidance control section 113 causes the voice synthesis section 113b to synthesize a voice message saying "Your FAX number is 'XXXX', isn't it? If it is correct, please press the button '0'. If not, please press the button '1'", and sends the voice message to the user's FAX machine.

[S55] When receiving the voice message from the navigator server 100, the user presses the button '0' if the FAX number is correct, or presses the button '1' if the FAX number is incorrect.

[S56] The guidance control section 113 of the navigator server 100 causes the audio recognition section 113a to identify the button pressed by the user. If the button '0' was pressed, the program proceeds to a step S57, whereas if the button '1' was pressed, the program returns to the step S52.

[S57] The guidance control section 113 prompts the user to select a menu number from the service menu and press a button corresponding to the menu number. More specifically, the guidance control section 113 causes the voice synthesis section 113b to synthesize a voice message saying "Please give us the coordinates of a link to Web page contents you would like to view", and sends the voice message to the user's FAX machine 23.

[S58] When receiving the voice message from the navigator server 100, the user selects from the obtained Web page contents a boxed portion indicative of the link to the desired Web page contents and looks up coordinates of a location of the link. Then, the user enters the coordinates in the order of an X coordinate and a Y coordinate.

[S59] The guidance control section 113 of the navigator server 100 identifies the coordinates entered by the user, and delivers the same to the image processing section 116. At the same time, the guidance control section 113 sends the user's service number to the database access section 114. The database access section 114 searches the service management table 111b to extract a latest URL address-position associated with the received service number, and sends the same to the guidance control section 113.

The guidance control section 113 inquires of the user as to whether the Web page contents indicated by the URL address received from the database access section 114 should be faxed. More specifically, a message saying "The URL of the contents you'd like to view is "XXXX", isn't it? If it is correct, please press the button '0'. If not, please press the button '1'" is sent to the user's FAX machine 23.

[S60] The user replies to the query from the navigator server 100, and hangs up the receiver. Then, the program proceeds to the step S31 in FIG. 10. The subsequent operations are carried out as shown in FIG. 10.

Thus, the user can obtain Web page contents linked to a portion of the current or link-embedded Web page contents already obtained, by designating matrix coordinates indicative of the portion. As a result, the following effects can be obtained.

First of all, the user is only required to carry out simple operations by following guidance, and hence general public can utilize the present system without any difficulty.

Further, if a person who wants to browse home pages on the Internet has no personal computer or portable intelligent terminal at hand, he/she can obtain Web page contents by using a telephone set and a FAX machine (or a FAX machine having telephone communication facility), which enhances convenience of utilization of the Internet.

Moreover, the present system makes it possible to obtain linked Web page contents, by designating coordinates of a location of a link embedded in the current Web page contents already received, so that the user can view Web page contents by following one link to another, similarly to a case in which a WWW browser running on a computer is used.

Although in the above embodiment, the image processing section generates images, this is not limitative, but a typical WWW browser can be used for generation of images of Web page contents. In this case, the image processing section sends to the WWW browser an HTML document, image data to be displayed as inline graphic images in the HTML document, and so forth, and receives a generated image from the WWW browser. Then, the image processing section adds matrix coordinate scales to the image to generate a new image, and sends this image to the user by FAX. Further, to obtain Web page contents referenced by a link within other Web page contents, an HTML document describing the other Web page contents is analyzed, and then a location of a link within an image displayed by a WWW browser based on the HTML document is calculated, whereby the link information indicated by a link coordinate value designated by the user is identified.

Further, the above processing capabilities can be implemented by a computer. In this case, functions to be realized by the hypertext information acquisition section in the above embodiment are written in a program stored in a computer-readable recording medium. The computer executes the program to thereby implement the above processing capabilities. The computer-readable recording medium may be a magnetic recording medium, semiconductor memory or the like. In order to market the program, it is possible to store them on transportable recording media such as CD-ROMs (Compact Disk Read Only Memories) and floppy disks for distribution, or store the same on a storage device connected to a computer via a network for transfer to other computers. Each program is executed by storing it e.g. on a hard disk within the computer and loading it into main memory.

As described above, according to the present invention, by designating coordinates of a link within current Web page contents which references other Web page contents, the linked or referenced other Web page contents can be obtained. Further, since an image having matrix coordinate scales added thereto is generated from newly downloaded Web page contents, a user can recognize coordinates of the link to other Web page contents with reference to the generated image. Therefore, the user can follow one link to another by designating coordinate values of links located within respective images generated, and thereby acquire desired information.

On the other hand, according to the computer-readable recording medium storing the hypertext information acquisition program of the present invention, it is possible to cause a computer to execute the stored hypertext information acquisition program so as to download Web page contents referenced from link-embedded Web page contents having a link to the Web page contents embedded therein simply by designating coordinates of the link, and generate an image having matrix coordinate scales added thereto, based on the downloaded Web page contents.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A hypertext information acquisition system for acquiring document contents in a hypertext form, comprising:

contents acquisition means for acquiring document contents in response to a request;

linked contents request means for outputting to said contents acquisition means a request for acquisition of linked document contents referenced by a link within link-embedded document contents, a location of said link being indicated by coordinates on an image generated from said link-embedded document contents, in response to inputting of a link coordinate value indicative of said coordinates; and image generation means for generating an image from document contents acquired by said contents acquisition means, said image having matrix coordinate scales added thereto.

2. A hypertext information acquisition system according to claim 1, further comprising image transmission means for transmitting said image generated by said image generation means as facsimile data.

3. A hypertext information acquisition system according to claim 1, further comprising user command analysis means for carrying out interactive data communications with a user's telephone set by using audio signals to thereby recognize a request from said user, and for outputting, to said linked contents request means, said link coordinate value entered by said user from said user's telephone set when said user demands said linked document contents referenced from said link-embedded document contents.

4. A hypertext information acquisition system according to claim 1, wherein said linked contents request means manages document contents which each user has acquired most recently, as said link-embedded document contents.

5. A hypertext information acquisition system according to claim 1, wherein said image generation means generates an image in which said link to said linked document contents is emphasized.

6. A computer-readable recording medium storing a hypertext information acquisition program for acquiring document contents in a hypertext form, said program causing a computer to function as:

contents acquisition means for acquiring document contents in response to a request;

linked contents request means for outputting to said contents acquisition means a request for acquisition of linked document contents referenced by a link within link-embedded document contents, a location of said link being indicated by coordinates on an image generated from said link-embedded document contents, in response to inputting of a link coordinate value indicative of said coordinates; and image generation means for generating an image from document contents acquired by said contents acquisition means, said image having matrix coordinate scales added thereto.

* * * * *